United States Patent [19]

Henson

[11] Patent Number: 4,960,286
[45] Date of Patent: Oct. 2, 1990

[54] SELF-PROPELLED VEHICLE

[76] Inventor: Kerry L. Henson, 1369 David La., Frederick, Md. 21701

[21] Appl. No.: 339,301

[22] Filed: Apr. 17, 1989

[51] Int. Cl.⁵ .............................................. B62M 1/14
[52] U.S. Cl. ..................................... 280/247; 280/244; 280/264
[58] Field of Search ............ 280/210, 220, 221, 242.1, 280/244, 253, 259, 264, 270, 247

[56] References Cited

U.S. PATENT DOCUMENTS

| | | | |
|---|---|---|---|
| 1,531,710 | 3/1925 | McLaren | 280/264 X |
| 1,624,627 | 4/1927 | Scaffer | 280/1.12 |
| 2,173,520 | 9/1939 | Klatt | 280/247 |
| 3,006,659 | 10/1981 | Krasnoff et al. | 280/221 |
| 3,149,857 | 9/1964 | May | 280/247 |
| 4,189,166 | 2/1980 | Lindsey | 280/234 |
| 4,749,207 | 6/1988 | Oh | 280/247 |

FOREIGN PATENT DOCUMENTS

| | | | |
|---|---|---|---|
| 892421 | 10/1953 | Fed. Rep. of Germany | 280/253 |
| 344019 | 1/1960 | Switzerland | 280/244 |

Primary Examiner—Charles A. Marmor
Assistant Examiner—Alan M. Kagen
Attorney, Agent, or Firm—Leon Gilden

[57] ABSTRACT

A self-propelled vehicle wherein a platform is mounted overlying a trio of support members wherein the platform is provided with a rearwardly and upwardly extending guard overlying a caliper arrangement mounted to a central support column of the trio of columns. Forwardly the columns fixedly are mounted to a support cylinder rotatably mounting a steering column therethrough. An uppermost end of the steering column pivotally mounts a handlebar wherein the handlebar is provided with an outwardly extending handlebar flange that fixedly mounts an uppermost end of a drive link with a lowermost end of the drive link mounted eccentrically to a drive disk secured to a remote end of a axle rotatably mounting the forward wheel of the vehicle. Oscillation of the handlebar relative to the steering column rotatably drives the drive disk and the forward wheel.

4 Claims, 1 Drawing Sheet

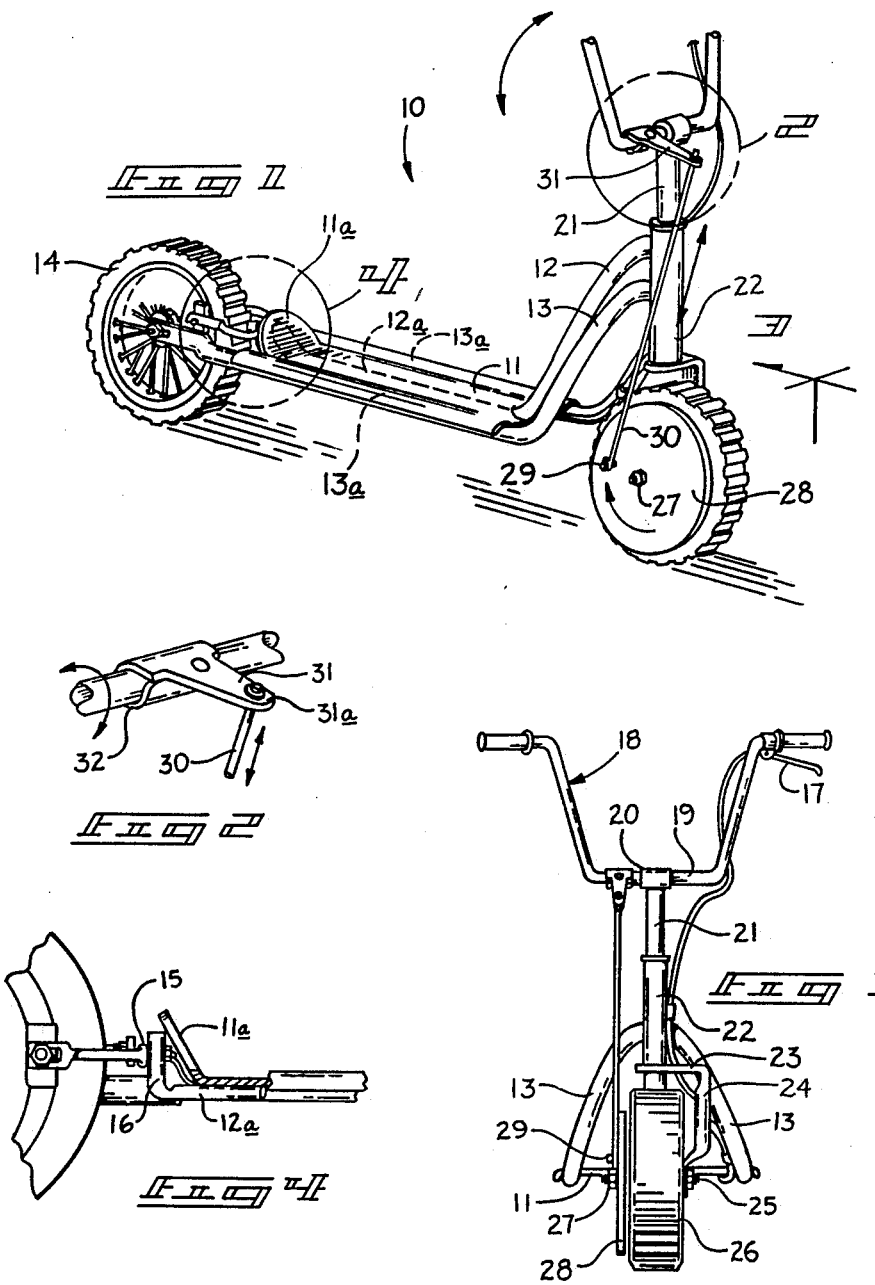

SELF-PROPELLED VEHICLE

BACKGROUND OF THE INVENTION

1. Field of the Invention

The field of invention relates to self-propelled vehicles, and more particularly pertains to a new and improved self-propelled vehicle that enables manual manipulation of a forwardly positioned handlebar to direct motive power to an underlying forward wheel on a vehicle.

2. Description of the Prior Art

The use of self-propelled vehicles utilizing manual application of power to drive the vehicles are known in the prior art. The vehicles of the prior art, however, have heretofore used relatively complex or elaborate organizations to apply motive power to the vehicle. For example, U.S. Pat. No. 1,624,627 to Schaeffer sets forth a self-propelled vehicle wherein a handle mounted rearwardly of a plurality of spaced wheels is mounted by an elongate link arrangement to a rear axle of a rear wheel to drive the rear axle by use of the forwardly mounted handle.

U.S. Pat. No. 2,173,523 Klatt sets forth a further example of a vehicle utilizing a forwardly mounted handle or bar pivotally mounted about a horizontal axis to drive a plurality of rear wheels by use of an offset crank pin arrangement of the axle supporting the rear wheels.

U.S. Pat. No. 3,149,857 to May sets forth a further example of a self-propelled vehicle utilizing a forward handle pivotally mounted in the same relative association as the Schaeffer and Klatt patents to drive a rear wheel organization.

U.S. Pat. No. 4,189,166 to Lindsey utilizes a forwardly and pivotally mounted handlebar to drive a sprocket overlying a forward wheel. The Lindsey patent sets forth a relatively complex and cumbersome arrangement, as opposed to the instant invention utilizing a single downwardly extending link to drive the forward wheel.

U.S. Pat. No. 4,749,207 to Oh sets forth yet another example of a forwardly and pivotally mounted handle to drive a crank pin arrangement of an axle supporting spaced rear wheels.

As such, it may be appreciated that there is a continuing need for a new and improved self-propelled vehicle that addresses both the problems of compactness in organization and ease of use, and in this respect, the present invention substantially fulfills this need.

SUMMARY OF THE INVENTION

In view of the foregoing disadvantages inherent in the known types of self-propelled vehicles now present in the prior art, the present invention provides a self-propelled vehicle wherein the same utilizes a single drive link offset and acceptably mounted to a drive disk of the forward wheel to motivate the vehicle. As such, the general purpose of the present invention, which will be described subsequently in greater detail, is to provide a new and improved self-propelled vehicle which has all the advantages of the prior art self-propelled vehicles and none of the disadvantages.

To attain this, the present invention comprises a self-propelled vehicle utilizing a central platform with spaced horizontal support members directed forwardly to mount a support cylinder and directed rearwardly to mount the rear axle of the rear wheel. The central horizontal support column secures a caliper assembly forwardly of the rear wheel between the platform and the rear wheel and is actuated by means of a hand operated cable secured to a handlebar. The handlebar is pivotally mounted to a steering column rotatably mounted through a forward column. The steering column is fixedly secured to a generally "L" shaped plate that is secured to the forward wheel at one side of the forward wheel with a drive disk mounted to the other side of the forward wheel. The drive disk includes a boss member eccentrically mounted to the drive disk and cooperates with the handlebar by means of an elongate drive link. The drive link is mounted to a flange that is in turn mounted to the handlebar.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved self-propelled vehicle which has all the advantages of the prior art self-propelled vehicles and none of the disadvantages.

It is another object of the present invention to provide a new and improved self-propelled vehicle which may be easily and efficiently manufactured and marketed.

It is a further object of the present invention to provide a new and improved self-propelled vehicle which is of a durable and reliable construction.

An even further object of the present invention is to provide a new and improved self-propelled vehicle which is susceptible of a low cost of manufacture with regard to both materials and labor, and which accordingly is then susceptible of low prices of sale to the consuming public, thereby making such self-propelled vehicles economically available to the buying public.

Still yet another object of the present invention is to provide a new and improved self-propelled vehicle which provides in the apparatuses and methods of the prior art some of the advantages thereof, while simultaneously overcoming some of the disadvantages normally associated therewith.

Still another object of the present invention is to provide a new and improved self-propelled vehicle wherein the same utilizes a pivotally mounted handlebar to rotate an underlying forward wheel of the associated vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric illustration of the handlebar and flange in association with the drive link of the instant invention as taken along the section 2 of FIG. 1.

FIG. 3 is an orthographic front view taken in elevation of the instant invention.

FIG. 4 is an orthographic side view taken in elevation of section 4 of FIG. 1.

DESCRIPTION OF THE PREFERRED EMBODIMENT

With reference now to the drawings, and in particular to FIGS. 1 to 4 thereof, a new and improved self-propelled vehicle embodying the principles and concepts of the present invention and generally designated by the reference numeral 10 will be described.

More specifically, the self-propelled vehicle 10 of the instant invention essentially comprises an elongate planar platform 11 formed with an upwardly extending rear guard 11a oriented at an oblique angle relative to an upper surface of the platform 11. The platform 11 is integrally secured to a pair of horizontal elongate supports 13a secured within arcuate channels at terminal sides of the platform 11. The horizontal elongate supports 13a merge forwardly with upwardly extending vertical side support columns 13. A central support column 12 is positioned medially of the side support columns 13 and extends rearwardly between the horizontal supports 13a to provide a horizontal central support 12a that extends rearwardly and terminates in an upwardly extending rear vertical leg 16 positioned medially of the rear wheel 14 of the vehicle 10. A brake caliper assembly 15 is secured to the rear vertical leg 16 and cooperates with a hand lever and cable 17 secured to a "U" shaped handlebar 18 of the organization. The side support columns 13 extend rearwardly and beyond the vertical leg 16 into bifurcated ends to secure an axle of the rear wheel 14 and rotatably mount the rear wheel 14 in alignment with the platform 11. The forward terminal ends of the central support column 12 and the vertical side support columns 13 are secured to a steering column support cylinder 22 that rotatably mounts a steering column 21 therewithin. The steering column 21 has formed at its upper end a handlebar yoke 20 pivotally mounting the "U" shaped handlebar 18 medially of the handlebar 18 onto a connecting leg 19. The connecting leg 19 pivotally mounted within the yoke enables an oscillating motion to be effected by a user of the device, as indicated by the arrows in FIGS. 1 and 2.

The lowermost end of the steering column 21 is integrally secured to a horizontal steering plate 23 that has at its outer end integrally formed an orthogonally and downwardly depending leg 24. The steering leg 24 is secured to a first end of a forward axle 25 of the forward wheel 26 of the vehicle 10. A remote second end of the forward axle 25 captures and integrally secures a drive disk 28 to the forward wheel 26, wherein the drive disk 28 is integrally mounted to a right side of the forward wheel 26 to rotate in unison therewith. The drive disk 28 further includes a disk boss 29 extending orthogonally and outwardly of an exterior surface of the drive disk 28 and rotatably mounts a lowermost end of an elongate drive link 30. The drive link 30 extends upwardly and is secured at its upper end to a forward end 31a of a handlebar flange 31. The handlebar flange 31 is integrally secured to the connecting leg 19 of the "U" shaped handlebar 18 by utilization of an encircling cylinder 32 to secure the connecting leg 19 integrally thereto. It may be appreciated therefore that as the handlebar 18 is oscillated, the drive disk 28 is rotated in response to reciprocation of the drive link 30 to provide motive power to the vehicle 10.

As to the manner of usage and operation of the instant invention, the same should be apparent from the above description and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A self-propelled vehicle comprising,
   a pair of spaced elongate side horizontal supports integrally mounting at upper surfaces of the horizontal side supports of an elongate central platform, said platform further including a central horizontal support fixedly secured to the platform medially of said horizontal supports and terminating rearwardly of said platform with an upwardly extending rear vertical leg, said rear vertical leg mounting a brake assembly thereto to cooperate with a rear wheel positioned rearwardly of said brake assembly, and
   said side horizontal supports and said central support extending forwardly and upwardly relative to said platform and integrally secured to a vertically oriented support cylinder relative to said platform, and said support cylinder rotatably mounting therein a steering column, and an upper end of said steering column pivotally mounting a "U" shaped handlebar medially of said handlebar, and a lowermost end of said steering column secured to a forward wheel, and a drive means mounted to said handlebar and said forward wheel to rotate said forward wheel in response to oscillation of said handlebar relative to said steering column, and wherein said side horizontal supports extend rearwardly of said rear vertical leg and terminate in bifurcated ends to rotatably mount said rear wheel medially and rearwardly of said platform, and wherein said drive means includes a drive disk axially and integrally mounted to a first side of said forward wheel including a drive boss extending orthogonally outwardly of said drive disk and including an elongate drive link mounted rotatably at a lowermost end of the drive link to the drive boss, and wherein an upper end of the drive link is pivotally mounted to an elongate handlebar flange, and said handlebar flange includes a forward end pivotally mounting said drive link and includes a rear end integrally secured to the handlebar, and wherein the handlebar includes a connecting leg wherein the handlebar flange is mounted offset from a central portion of said connecting leg and wherein said handlebar flange includes an encircling flange cylinder to integrally secure said handlebar flange to said handlebar.

2. A self-propelled vehicle as set forth in claim 1 wherein the steering column includes a cylindrical yoke mounted orthogonally to an upper end of said steering column and wherein said yoke rotatably receives said handlebar medially of the connecting leg.

3. A self-propelled vehicle as set forth in claim 2 wherein a lowermost end of the steering column includes a horizontal steering plate integrally secured orthogonally relative to said steering column, and said steering plate includes a downwardly depending steering leg, and said steering leg is directed downwardly to a second side of the forward wheel, and a lowermost end of the steering leg includes a remote end of the forward axle integrally secured to the steering leg.

4. A self-propelled vehicle as set forth in claim 3 wherein a rearwardmost end of the platform includes a rear guard extending obliquely and upwardly relative to an upper surface of the platform to overlie the brake assembly.

* * * * *